United States Patent
Kim et al.

(10) Patent No.: US 12,508,796 B2
(45) Date of Patent: Dec. 30, 2025

(54) UNCONSTRAINED VIBRATION DAMPING METAL SHEET WITH FOAM PORES AND METHOD FOR MANUFACTURING SAME

(71) Applicant: POSCO Co., Ltd, Pohang-si (KR)

(72) Inventors: Jin-Tae Kim, Gwangyang-si (KR); Dae-Gyu Kang, Incheon (KR); Yang-Ho Choi, Gwangyang-si (KR); Jung-Hwan Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 279 days.

(21) Appl. No.: 18/265,566

(22) PCT Filed: Nov. 30, 2021

(86) PCT No.: PCT/KR2021/017830
§ 371 (c)(1),
(2) Date: Jun. 6, 2023

(87) PCT Pub. No.: WO2022/139218
PCT Pub. Date: Jun. 30, 2022

(65) Prior Publication Data
US 2024/0092060 A1    Mar. 21, 2024

(30) Foreign Application Priority Data
Dec. 21, 2020    (KR) .................. 10-2020-0179434

(51) Int. Cl.
*B32B 15/04*       (2006.01)
*B32B 5/20*        (2006.01)
(Continued)

(52) U.S. Cl.
CPC .............. *B32B 15/046* (2013.01); *B32B 5/20* (2013.01); *B32B 15/18* (2013.01); *C08J 9/0023* (2013.01);
(Continued)

(58) Field of Classification Search
CPC ....... B32B 15/046; B32B 15/18; B32B 15/20; B32B 2250/02; B32B 2255/06;
(Continued)

(56) References Cited

U.S. PATENT DOCUMENTS

| | | | | |
|---|---|---|---|---|
| 2006/0099429 A1* | 5/2006 | Domes | .............. | C23C 22/53 |
| | | | | 427/372.2 |
| 2015/0259497 A1* | 9/2015 | Mihara | .............. | C08K 5/12 |
| | | | | 521/59 |
| 2016/0152837 A1* | 6/2016 | Wolpers | .............. | C23C 22/34 |
| | | | | 106/14.12 |

FOREIGN PATENT DOCUMENTS

| | | | |
|---|---|---|---|
| JP | S51-093770 A | 8/1976 | |
| JP | S56-159160 A | 12/1981 | |

(Continued)

OTHER PUBLICATIONS

Translation of JP H04145174, May 19, 1992. (Year: 1992).*
(Continued)

*Primary Examiner* — Hai Vo
(74) *Attorney, Agent, or Firm* — Morgan, Lewis & Bockius LLP

(57) ABSTRACT

Provided is an unconstrained vibration damping metal sheet with foam pores. The unconstrained vibration damping metal sheet of the present invention comprises: a metal sheet; an organic-inorganic pretreatment layer containing an acrylic resin formed on the metal sheet; and a foam resin layer formed on the pretreatment layer, the foam resin layer containing, based on weight % thereof, a thermoplastic polyvinyl chloride resin: 40-80%, a plasticizer: 5-40%, a foaming agent: 0.1-10%, an oxide-based crosslinker: 1-4%, and spherical silica: 1-10%.

11 Claims, 3 Drawing Sheets

(51) Int. Cl.
  *B32B 15/18* (2006.01)
  *C08J 9/00* (2006.01)
  *C08J 9/10* (2006.01)
  *C08K 3/36* (2006.01)
  *C08K 5/11* (2006.01)
  *C08K 5/14* (2006.01)
  *C08K 7/18* (2006.01)
  *C09D 5/00* (2006.01)
  *C09D 7/40* (2018.01)
  *C09D 7/61* (2018.01)
  *C09D 7/63* (2018.01)
  *C09D 127/06* (2006.01)
  *C09D 133/08* (2006.01)

(52) U.S. Cl.
  CPC .............. *C08J 9/103* (2013.01); *C08K 3/36* (2013.01); *C08K 5/11* (2013.01); *C08K 5/14* (2013.01); *C08K 7/18* (2013.01); *C09D 5/002* (2013.01); *C09D 7/61* (2018.01); *C09D 7/63* (2018.01); *C09D 7/69* (2018.01); *C09D 7/70* (2018.01); *C09D 127/06* (2013.01); *C09D 133/08* (2013.01); *B32B 2250/02* (2013.01); *B32B 2255/06* (2013.01); *B32B 2255/26* (2013.01); *B32B 2266/0235* (2013.01); *B32B 2266/104* (2016.11); *B32B 2307/102* (2013.01); *B32B 2307/56* (2013.01); *B32B 2307/7376* (2023.05); *C08J 2327/06* (2013.01)

(58) Field of Classification Search
  CPC ........ B32B 2255/26; B32B 2264/1021; B32B 2264/302; B32B 2266/0235; B32B 2266/104; B32B 2307/102; B32B 2307/56; B32B 2307/7376; B32B 5/18; B32B 5/20; B32B 7/12; C08J 2201/026; C08J 2203/04; C08J 2205/044; C08J 2327/06; C08J 9/0023; C08J 9/103; C08J 9/32; C08K 13/04; C08K 3/36; C08K 5/11; C08K 5/14; C08K 5/29; C08K 7/18; C09D 127/06; C09D 133/08; C09D 5/002; C09D 7/61; C09D 7/63; C09D 7/69; C09D 7/70; F16F 2224/0225; F16F 2228/007; F16F 2230/40; F16F 7/00; G10K 11/165; G10K 11/168

See application file for complete search history.

(56) References Cited

FOREIGN PATENT DOCUMENTS

| | | | |
|---|---|---|---|
| JP | S58-224738 | A | 12/1983 |
| JP | S59-152847 | A | 8/1984 |
| JP | S63-236633 | A | 10/1988 |
| JP | H04-145174 | A | 5/1992 |
| JP | H07-024946 | A | 1/1995 |
| JP | H07-17801 | B2 | 3/1995 |
| JP | 2660508 | B2 | 10/1997 |
| JP | 2957303 | B2 | 10/1999 |
| JP | 2005-131830 | A | 5/2005 |
| JP | 2005-186303 | A | 7/2005 |
| JP | 2007-162749 | A | 6/2007 |
| JP | 2013-086391 | A | 5/2013 |
| JP | 2015-172142 | A | 10/2015 |
| KR | 10-2008-0056829 | A | 6/2008 |
| KR | 10-2008-0061731 | A | 7/2008 |
| KR | 10-2019-0074993 | A | 6/2019 |

OTHER PUBLICATIONS

Translation of JPH0724946 A, Yada et al., Jan. 27, 1995 (Year: 1995).*
International Search Report dated Mar. 23, 2022, issued in International Patent Application No. PCT/KR2021/017830 (with English translation).
Extended European Search Report issued Feb. 29, 2024 for European Patent Application No. 21911285.1.
Japanese Office Action dated Jan. 7, 2025 issued in Japanese Patent Application No. 2023-537349 (with English translation).
Office Action dated Jun. 11, 2024, issued in corresponding Chinese Patent Application No. 202180086539.1.
Office Action dated Jun. 18, 2024, issued in corresponding Japanese Patent Application No. 2023-537349.
Office Action dated Apr. 29, 2025, issued in corresponding European Patent Application No. 21911285.1.

* cited by examiner

Block Diagram of Experimental Set-up using a Two-Channel Spectrum Analyzer and Random Noise Excitation Signal

UNCONSTRAINED VIBRATION DAMPING METAL SHEET WITH FOAM PORES AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/017830, filed on Nov. 30, 2021, which in turn claims the benefit of Korean Application No. 10-2020-0179434, filed on Dec. 21, 2020, the disclosures of which applications are incorporated by reference herein.

TECHNICAL FIELD

The present disclosure relates to manufacturing of an unconstrained vibration damping metal sheet with foam pores, and more particularly, to an unconstrained vibration damping metal sheet with foam pores having a vibration control and noise blocking effect by using pores formed through foaming in a coating film of the metal sheet, and a method for manufacturing the same.

BACKGROUND ART

In general, a vibration damping steel sheet is a steel sheet in the form of a constrained composite steel sheet manufactured by laminating a resin between two steel sheets, and in the form of an unconstrained steel sheet manufactured by coating or laminating a resin on one steel sheet, and is roughly classified into an unconstrained vibration damping steel sheet serving to block noise or vibrations. The unconstrained steel sheet has a two-layer structure and thus has a simple manufacturing process, but has a relatively low vibration damping effect compared to the constrained steel sheet and thus has inferior performance as a vibration damping steel sheet, so most vibration damping steel sheets have a constrained structure.

In other words, although there is a difference in the form of showing the effect of vibration damping of the constrained and unconstrained steel sheets, the constrained vibration damping steel sheet serves to absorb external noise or vibrations energy applied to the steel sheet as thermal energy by shear deformation of the resin laminated between the steel sheets to reduce noise or vibrations. On the other hand, the unconstrained vibration damping steel sheet serves to absorb external noise or vibration energy applied to the steel sheet as thermal energy by expansion and contraction of the resin coated on the steel sheet to reduce noise or vibrations.

Such vibration damping steel sheets may be used in a wide variety of areas such as outer panels of household appliances that generate a lot of noise, such as a refrigerator, a washing machine, and an air purifier, an oil pan in an engine part, which is a main cause of automobile noise, automobile parts such as a dash panel, precision instruments, and construction materials.

However, in conventional vibration damping steel sheet, vibration damping performance is implemented by inserting a thermoplastic polymer resin such as polyethylene into the steel sheet in the form of a sandwich panel or applying a liquid polymer resin to the steel sheet. That is, typically, it has been known that polymer resins such as polyester (Japanese Patent Laid-Open Publication No. 51-93770), polyamide (Japanese Patent Laid-Open Publication No. 56-159160), ethylene/α-olefin, and cross-linked polyolefin (Japanese Patent Laid-Open Publication No. 59-152847) are used to secure the vibration damping performance, but the polymer resins have limitations in application to the above-mentioned home appliances or automobiles that generate a lot of noise.

DISCLOSURE

Technical Problem

The present disclosure provides an unconstrained vibration damping metal sheet with foam pores capable of minimizing vibration/noise of a product by implementing vibration damping performance and sound insulation performance using viscoelastic properties of a polymer resin and a vibration/noise blocking effect of the foam pores in order to improve the vibration damping performance.

Objects of the present disclosure are not limited to the above-mentioned objects. That is, other objects that are not mentioned may be obviously understood by those skilled in the art to which the present disclosure pertains from the following description.

Technical Solution

In an aspect of the present disclosure, an unconstrained vibration damping metal sheet with foam pores may include:
 a metal sheet;
 an organic-inorganic pretreatment layer containing an acrylic resin formed on the metal sheet; and
 a foam resin layer formed on the pretreatment layer, wherein the foam resin layer contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%.

The foaming agent may be a powder foaming agent or a foamed capsule.

The powder foaming agent may be an azodicarbonamide-based powder foaming agent.

The foamed capsule may be a foamed capsule having a diameter of 1 to 20 μm in which a foaming agent is contained in a thermoplastic cell structure.

The foam resin layer may have a foam pore having an average diameter of 5 to 100 μm.

A thickness of the pretreatment layer may range from 0.1 to 2 μm.

A thickness of the foam resin layer may range from 5 to 200 μm.

The metal sheet may be one selected from a cold-rolled steel sheet, a hot-rolled steel sheet, a galvanized steel sheet, a zinc alloy-plated steel sheet, a stainless steel sheet, and an aluminum plate.

The oxide-based crosslinker may be dicumyl peroxide.

An average diameter of the spherical silica may have a size ranging from 1 to 30 μm.

The plasticizer may be one selected from the group consisting of bis (2-ethylhexyl) adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), and trimethyl tentanyl diisobutylate.

In another aspect of the present disclosure, a method for manufacturing an unconstrained vibration damping metal sheet with foam pores may include:

preparing a base metal sheet;
forming a pretreatment layer with a thickness of 0.1 to 2 μm by applying an organic-inorganic pretreatment solution containing an acrylic resin on the base metal sheet and then curing the organic-inorganic pretreatment solution at 60 to 150° C.; and
forming a foam resin layer by applying a foam resin solution, which contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%, on the formed pretreatment layer to a thickness of 5 to 200 μm and foaming the foam resin solution in a temperature range of 200 to 220° C.

Advantageous Effects

As set forth above, according to the present disclosure, by mixing a foaming agent with a main resin containing a thermoplastic resin and a plasticizer and forming the mixture on a metal sheet having a foam resin layer, it is possible to effectively provide an unconstrained vibration damping steel sheet with excellent vibration damping characteristics.

BEST MODE

Hereinafter, the present disclosure will be described below.

The present disclosure is a technology for improving vibration damping performance of a metal sheet by applying foam pores to a coating film. Specifically, the present disclosure is characterized by improving vibration damping performance of a metal sheet so that noise/vibration generated by exposing foam pores to a noise/vibration source is blocked from pores.

Figure 1:
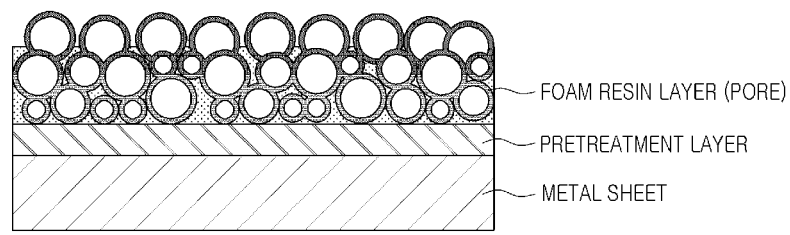
FIG. 1 is a schematic cross-sectional view of an unconstrained vibration damping metal sheet according to an exemplary embodiment in the present disclosure.

As illustrated in FIG. 1, the unconstrained vibration damping metal sheet of the present disclosure includes: a metal sheet; an organic-inorganic pretreatment layer containing an acrylic resin formed on the metal sheet; and a foam resin layer formed on the pretreatment layer, the foam resin layer containing, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%. Alternatively, instead of the powder foaming agent, a foamed capsule having a diameter of 1 to 20 μm containing the foaming agent in a thermoplastic cell structure may be used as a foaming agent.

First, the unconstrained vibration damping metal sheet of the present disclosure includes a metal sheet on which the foam resin layer is formed. In the present disclosure, the metal sheet may be one selected from a cold-rolled steel sheet, a hot-rolled steel sheet, a galvanized steel sheet, a zinc alloy-plated steel sheet, a stainless steel sheet, and an aluminum plate, and a thickness of the metal sheet may range from 0.2 to 2.0 mm.

The vibration damping metal sheet of the present disclosure also includes an organic-inorganic pretreatment layer containing an acrylic resin formed on the metal sheet.

In the present disclosure, an organic-inorganic pretreatment layer containing an acrylic resin is formed on the metal sheet in order to enhance corrosion resistance of the metal sheet and coating film adhesion between the metal sheet and the vibration damping coating film.

In the present disclosure, it is preferable to control a thickness of the pretreatment layer to be in the range of 0.1 to 2 μm. The reason is that, when the thickness of the pretreatment layer is less than 0.1 μm, adhesion to the polyvinyl chloride vibration damping resin layer described later is insufficient, but when the thickness of the pretreatment layer exceeds 2 μm, it is not economically advantageous due to an excessive coating layer.

The vibration damping metal sheet of the present disclosure includes the foam resin layer formed on the pretreatment layer, in which the foam resin layer contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%. Hereinafter, "%" means "wt %" unless otherwise indicated.

First, the foam resin layer of the present disclosure contains, based on weight % thereof, thermoplastic polyvinyl chloride in the range of 40 to 80% as a polymer resin. In this case, the content may be adjusted according to workability and a thickness of a coating film. When the content of the polyvinyl chloride resin is less than 40%, the effect of the vibration damping performance may be reduced due to insufficient resin content, whereas when the content of the polyvinyl chloride resin exceeds 80%, the viscosity is too high, and the workability may be lowered.

Meanwhile, when using a polyvinyl chloride resin, a plasticizer should be included for the flexibility and workability of the solution, and the foam resin layer of the present disclosure may include a plasticizer within the range of 5 to 40%. When the content of the plasticizer is less than 5%, the viscosity of the polyvinyl chloride solution is too high, resulting in poor workability, whereas when the content of the plasticizer exceeds 40%, the viscosity is too low or the coating film becomes too soft and difficult to maintain as a vibration damping steel sheet coating film.

In the present disclosure, as the plasticizer, bis (2-ethylhexyl) adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), trimethyl tentanyl diisobutylate, and the like may be used, and the type of plasticizer is not particularly limited.

In addition, the foam resin layer of the present disclosure may include spherical silica in the range of 1 to 10% to improve the hardness of the coating film because the hardness of the coating film may be weakened when the coating film is foamed. When the content of the spherical silica is less than 1%, it is difficult to see the effect of improving the hardness of the coating film, whereas when the content of the spherical silica exceeds 10%, the coating film becomes too hard, which may cause problems during processing and may be economically unfavorable.

The present disclosure is not particularly limited to the size of the spherical silica, but an average diameter of the spherical silica may be limited to the range of 1 to 30 μm. When the average diameter of the silica is less than 1 μm, it may increase the viscosity of the solution or does not help improve the hardness, whereas, when the average diameter of the silica exceeds 30 μm, the stability of the solution may decrease or the formation of foam pores may be restricted.

In addition, the foam resin layer of the present disclosure includes a foaming agent to form pores through foaming in a molecular resin. In this case, a foaming agent in the form of a powder or a foaming agent in the form of a capsule may be used.

When using the foaming agent in the form of powder, it is preferable to control the content of the foaming agent to be in the range of 0.1 to 10%. When the content of the foaming agent is less than 0.1%, the amount of foaming agent is too small to exhibit the functions of the vibration damping performance and the sound insulation performance, and when the content of the foaming agent exceeds 10%, the viscosity of the solution increases when the solution is prepared, the increase in the viscosity of the solution may make coating work difficult, and the increase in the price of the solution may cause economic problems.

In this case, a foaming agent that foams at 200 to 210° C. of the pore formation temperature of the powder foaming agent, which corresponds to the curing temperature of the coating film, may be used. In the case of using such a powder foaming agent in the present disclosure, an azodicarbonamide-based powder foaming agent is usually used, but the power foaming agent is not limited thereto.

Meanwhile, in the case of the foaming using the powder foaming agent described above, a phenomenon in which a polymer resin is foamed due to the gas generated by the decomposition of the foaming agent at a certain temperature or higher in an enclosed space is used, but in an open space, the generated gas may not be maintained inside a coating resin and does not form bubbles and disappears altogether, so it is difficult to use polymer resins and solutions to be foamed in coated products. Therefore, when foaming gas is generated to form bubbles, in order to maintain the pores, an oxide-based crosslinker such as dicumyl peroxide should be added so that the generated gas may form pores.

Alternatively, in the present disclosure, the foamed capsule may be used as the foaming agent, and for example, 0.1 to 10% of foamed capsules having a diameter of 1 to 20 μm containing a foaming agent in a thermoplastic cell structure may also be used. In the case of the form of the foamed capsule, the foaming agent itself forms pores by using the foamed capsule of 1 to 20 μm that may form pores. That is, the pores of the present disclosure may adopt a method of forming pores in a coating film by foaming a foamed capsule, not foaming the coating film. The capsule foaming agent used is the form in which the foaming agent is contained in the spherical thermoplastic cell structure having a size of 1 to 20 μm. When the capsule foaming agent is heated, the cells outside the foamed capsule are first softened and the foaming agent inside is vaporized and the internal pressure is increased so that the entire microcapsule expands to form pores.

In the present disclosure, the foaming agent in which foaming is performed at 160 to 220° C., which corresponds to the curing temperature of the coating film, may be used without limitation. For example, the conventional azodicarbonamide-based foaming agent may be used.

In the present disclosure, it is preferable to limit the added amount of crosslinker to the range of 1 to 4%. When the added amount of crosslinker is less than 1%, it is difficult to play a role as a crosslinker, and when the added amount of crosslinker exceeds 4%, due to the increase in the crosslinking degree, crosslinked parts occur before foam cells are formed, which may lead to a decrease in a foaming rate.

Meanwhile, in the present disclosure, ZnO, which is a commonly used foaming aid, is not used. Because the gas generation temperature of the foaming agent may be lowered when the foaming aid is added, the gas generation temperature becomes 140 to 160° C. when ZnO is added. However, as in the case of the present disclosure, in the foaming condition in an open space, it is necessary to generate gas at a high temperature so that the generated gas does not escape before forming pores.

Meanwhile, in the present disclosure, the thickness of the foam resin layer may be controlled in the range of 5 to 200 μm. When the thickness of the foam resin layer is less than 5 μm, the effect on vibration damping performance is reduced, and when the thickness of the foam resin layer exceeds 200 μm, the vibration damping performance and the sound insulation performance are good, but difficulties may arise in molding due to the thick coating film during molding processing, and economic problems may occur. In addition, the foam resin layer may have foam pores having an average diameter of 5 to 100 μm. When the average diameter of the foam pores is less than 5 μm, the size of the pores is too small to obtain the effect of the pores, and when the average diameter of the foam pores exceeds 100 μm, the size of the pores in the coating film is too large, and the toughness of the coating film is reduced, which may cause the problem of the deterioration in the physical properties of the coating film during processing.

In addition, the foam resin layer of the present disclosure may include additives such as a wetting agent, an antifoaming agent, and an antioxidant at a conventional level.

Next, a method for manufacturing an unconstrained vibration damping metal sheet of the present disclosure will be described.

The method for manufacturing an unconstrained vibration damping metal sheet of the present disclosure includes preparing a base metal sheet; forming a pretreatment layer with a thickness of 0.1 to 2 μm by applying an organic-inorganic pretreatment solution containing an acrylic resin on the base metal sheet and then curing the organic-inorganic pretreatment solution at 60 to 150° C.; and forming a foam resin layer by applying a foam resin solution, which contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%, on the formed pretreatment layer to a thickness of 5 to 200 μm and foaming the foam resin solution in a temperature range of 200 to 220° C.

First, in the present disclosure, the base metal sheet is prepared, and as such a base metal sheet, one selected among a cold-rolled steel sheet, a hot-rolled steel sheet, a galvanized steel sheet, a zinc alloy-plated steel sheet, a stainless steel sheet, and an aluminum plate may be used.

In the present disclosure, the organic-inorganic pretreatment solution containing acrylic resin is applied on the base metal sheet and cured to form a pretreatment layer having a thickness of 0.1 to 2 μm. In this case, in the present disclosure, it is preferable to limit the curing temperature to 60 to 150° C. during the curing. When the curing temperature is less than 60° C., the uncuring of the coating film may occur, and when the curing temperature exceeds 150° C., the brittle property of the coating film increases due to overcuring, resulting in a problem in the physical properties of the coating film.

Thereafter, in the present disclosure, the vibration damping resin solution (foam resin solution) having the above-described composition is applied on the pretreatment layer to a thickness of 5 to 200 μm and then foamed, the vibration damping steel sheet with the foam resin layer formed on a surface thereof may be manufactured.

In this case, the vibration damping resin solution may be prepared by mixing each composition and then mixing the mixture in a high-speed stirrer and uniformly dispersing the mixture.

In the present disclosure, it is preferable to limit the foaming temperature to the range of 200 to 220° C. When the foaming temperature is less than 200° C., a large part of the foaming agent is not foamed and the foaming efficiency is reduced, but when the foaming temperature exceeds 220° C., the overfoaming occurs, resulting in the problem in that the foamed bubbles disappear.

MODE FOR INVENTION

Hereinafter, the present disclosure will be described in more detail with reference to Examples.

Example 1

A 0.8 T cold-rolled steel sheet was prepared. Subsequently, a pretreatment layer was formed by coating an organic-inorganic pretreatment solution containing an acrylic resin on the surface of the cold-rolled steel sheet to a thickness of 1.0 μm. Thereafter, a foam resin solution was applied on the pretreatment layer to form a foam resin layer having a thickness of 80 μm. In this case, the foamed resin solution contains, based on weight % thereof, thermoplastic polyvinyl chloride resin: 60 to 80%, DEHA plasticizer: 5 to 40%, dicumyl peroxide crosslinker: 1 to 4%, and spherical silica: 1 to 10%. A vibration damping steel sheet having a foam resin layer was prepared by adding an azodicarbonamide-based powder foaming agent to the foaming resin solution in different amounts as shown in Tables 1 and 2 below.

For each vibration damping steel sheet manufactured as described above, a loss factor and a sound insulation rate according to the content of the foaming agent were evaluated, and the results were shown in Tables 2 and 3, respectively.

Figure 2:
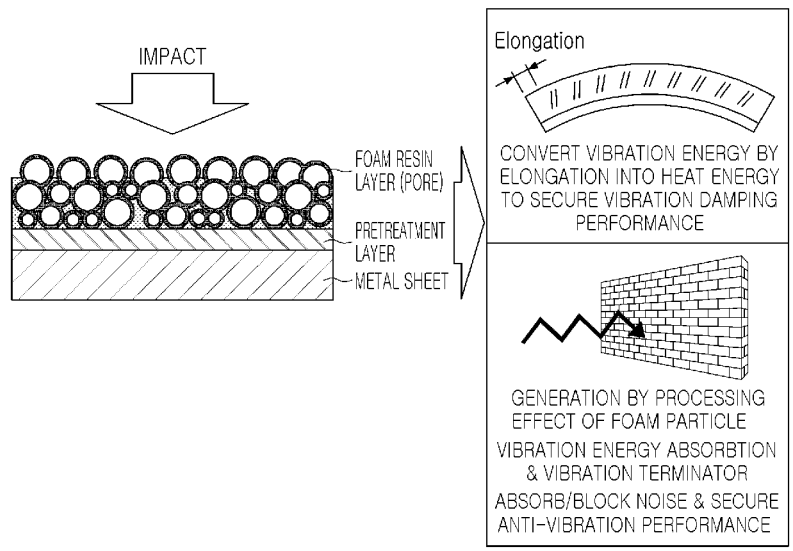
FIG. 2 is a diagram illustrating vibration damping performance of the unconstrained vibration damping metal sheet according to the exemplary embodiment in the present disclosure.
Figure 3:
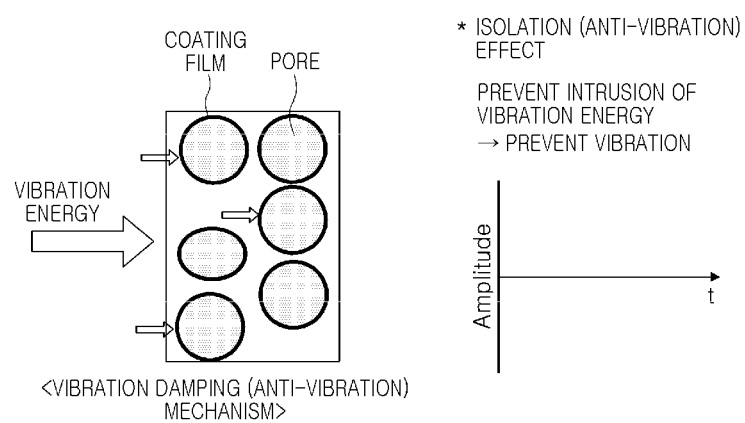
FIG. 3 is a diagram illustrating an effect of foamed pore particles contained in a foam resin layer in the present disclosure on the vibration damping performance.

Vibration damping performance is a quantity that represents the ability to convert vibration energy into thermal energy when vibration is applied to a material. FIG. 2 is a diagram illustrating vibration damping performance of the vibration damping metal sheet according to the exemplary embodiment in the present disclosure, and FIG. 3 is a diagram illustrating an effect of foamed pore particles contained in a foam resin layer in the present disclosure on the vibration damping performance.

The loss factor η, which has the same meaning as internal friction, is used as an indication of the vibration damping performance. Here, the loss factor η is defined by the following Relational Expression 1 when the total vibration energy of vibration system is E and energy dissipated by converting into thermal energy during 1 cycle vibration is ΔE.

$$\eta = \Delta E / 2\pi E \ (\eta \leq 1) \quad \text{[Relational Expression 1]}$$

Figure 4:
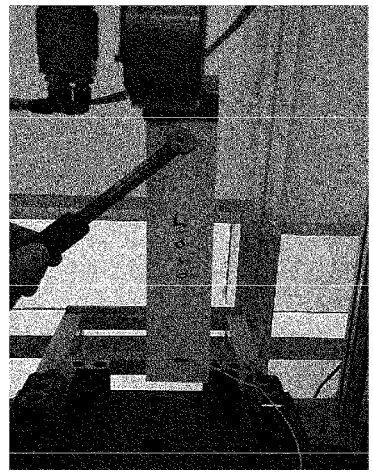
FIG. 4 is a diagram illustrating a modal evaluation method for measuring vibration damping performance.
Figure 4:
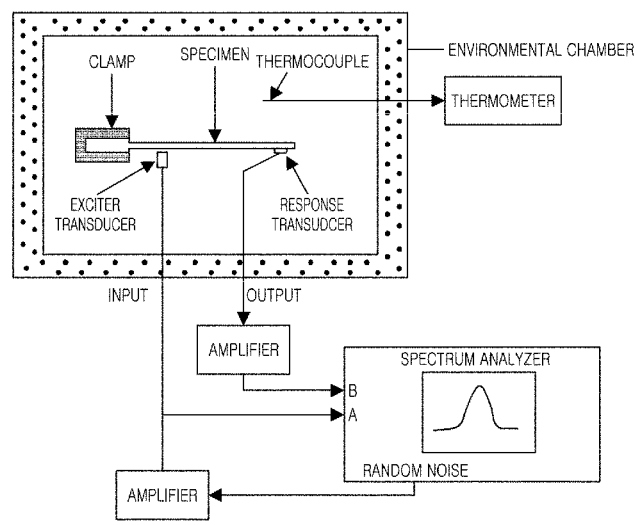

Meanwhile, as a loss factor measurement method, a modal evaluation method of FIG. 4 was used, and the modal evaluation method is an impact test method using a hammer on a test piece as a form of vibration test, and is a method for measuring the vibration damping performance by measuring the loss factor using the vibration properties generated after impact on the specimen. In this case, the loss factor values of a low frequency range of 1 khz or less and a high frequency range of 1 khz or more were measured. For reference, the higher the value of the loss coefficient, the better the vibration damping performance.

In addition, in order to confirm the effect of blocking noise caused by internal vibration, a sound insulation rate was measured through a sound insulation test. A sound insulation test is a test to evaluate how well a material used as a member separating spaces may block sound. In the sound insulation test, a sample whose performance is to be evaluated is placed between two spaces, and sizes of sound sources on both sides are measured and investigated. Transmittance, which is a ratio of transmitted sound energy to incident sound energy, is calculated with the intensity of sound measured in both spaces. The expression unit is represented by transmission loss (TL), which is a value obtained by taking the reciprocal of transmittance as a common logarithm, as shown in the following Relational Expression 2. In this case, the sound insulation of the low frequency range of 1 khz or less and the high frequency range of 1 khz or more was measured.

$$\text{TL(Transmission Loss)} = 10 \log(1/\tau) \quad \text{[Relational Expression 2]}$$

Here, τ represents transmittance.

TABLE 1

| Property | Measurement Area | Conventional Example Existing Painted Steel Sheet | Comparative Example 1 | Inventive Example 1 | Inventive Example 2 | Inventive Example 3 | Inventive Example 4 | Inventive Example 5 | Comparative Example 2 |
|---|---|---|---|---|---|---|---|---|---|
| | | | | Content of Powder Foaming Agent (%) | | | | | |
| | | | 0.06 | 0.1 | 1 | 1.5 | 5 | 10 | 12 |
| Loss Factor ($\times 10^{-3}$) | Low Frequency Range (1 khz Or less) | 6 | 6 | 9 | 9 | 9 | 10 | 9 | 9 |
| | High Frequency Range (1 khz Or More) | 0.6 | 0.6 | 3 | 2 | 4 | 4 | 3 | 2.5 |

TABLE 2

| Property | Measurement Area | Conventional Example Existing Painted Steel Sheet | Comparative Example 1 | Inventive Example 1 | Inventive Example 2 | Inventive Example 3 | Inventive Example 4 | Inventive Example 5 | Comparative Example 2 |
|---|---|---|---|---|---|---|---|---|---|
| | | | \multicolumn{7}{c}{Content of Powder Foaming Agent (%)} | | | | | | |
| | | | 0.06 | 0.1 | 1 | 1.5 | 5 | 10 | 12 |
| Transmission Loss (dB) | Low Frequency Range (1 khz Or less) | 32 | 32 | 33 | 39 | 40 | 43 | 43 | 42 |
| | High Frequency Range (1 khz Or More) | 38 | 38 | 39 | 43 | 46 | 48 | 47 | 47 |

As shown in Table 1 and 2, in the case of the foam resin layer of Inventive Examples 1 to 5 containing the content of the foaming agent powder meeting the range of the present disclosure on the cold-rolled steel sheet on which the organic-inorganic pretreatment layer containing acrylic resin was formed, it can be confirmed that the loss factor and transmission loss are excellent compared to the conventional examples that do not contain such a foaming agent.

In contrast, Comparative Example 1, in which the content of the foaming agent is insufficient, was difficult to expect the effect of foaming compared to the existing painted steel sheet. In Comparative Example 2 having an excessive content of foaming agent, it may difficult to expect an improved effect due to the additional addition due to the saturation of the foam pore formation compared to Inventive Examples 4 and 5, and the excessive foaming may cause the coating film to become soft or may economically unfavorable.

Example 2

A 0.8 T cold-rolled steel sheet was prepared. Subsequently, a pretreatment layer was formed by coating an organic-inorganic pretreatment solution containing an acrylic resin on the surface of the cold-rolled steel sheet to a thickness of 1.0 μm. Thereafter, a foam resin solution was applied on the pretreatment layer to form a foam resin layer having a thickness of 80 μm. In this case, the foamed resin solution contains, based on weight % thereof, thermoplastic polyvinyl chloride resin: 60 to 80%, DEHA plasticizer: 5 to 40%, dicumyl peroxide crosslinker: 1 to 4%, and spherical silica: 1 to 10%. A vibration damping steel sheet having a foam resin layer was prepared by adding a thermoplastic resin type capsule foaming agent to the foaming resin solution in different amounts as shown in Tables 3 and 4 below.

TABLE 3

| Property | Measurement Area | Conventional Example Existing Painted Steel Sheet | Comparative Example 3 | Inventive Example 6 | Inventive Example 7 | Inventive Example 8 | Inventive Example 9 | Inventive Example 10 | Comparative Example 4 |
|---|---|---|---|---|---|---|---|---|---|
| | | | \multicolumn{7}{c}{Content of Capsule Foaming Agent (%)} | | | | | | |
| | | | 0.06 | 0.1 | 1 | 1.5 | 5 | 10 | 12 |
| Loss Factor ($\times 10^{-3}$) | Low Frequency Range (1 khz Or less) | 6 | 6 | 8 | 9 | 10 | 10 | 9 | 9 |
| | High Frequency Range (1 khz Or More) | 0.6 | 0.6 | 2 | 3 | 4 | 5 | 5 | 3 |

TABLE 4

| Property | Measurement Area | Conventional Example Existing Painted Steel Sheet | Comparative Example 3 | Inventive Example 6 | Inventive Example 7 | Inventive Example 8 | Inventive Example 9 | Inventive Example 10 | Comparative 4 |
|---|---|---|---|---|---|---|---|---|---|
| | | | Content of Capsule Foaming Agent (%) | | | | | | |
| | | | 0.06 | 0.1 | 1 | 1.5 | 5 | 10 | 12 |
| Transmission Loss (dB) | Low Frequency Range (1 khz Or less) | 32 | 32 | 33 | 42 | 44 | 45 | 44 | 41 |
| | High Frequency Range (1 khz Or More) | 38 | 38 | 39 | 46 | 48 | 48 | 50 | 46 |

As shown in Tables 3 and 4, in the case of the foam resin layer of Inventive Examples 6 to 10 containing the content of the capsule foaming agent meeting the range of the present disclosure on the cold-rolled steel sheet on which the organic-inorganic pretreatment layer containing acrylic resin was formed, it can be confirmed that the loss factor and transmission loss are excellent compared to the conventional examples that do not contain such a foaming agent.

In contrast, Comparative Example 3, in which the content of the foaming agent is insufficient, was difficult to expect the effect of foaming compared to the existing painted steel sheet. In Comparative Example 4 having an excessive content of foaming agent, it may difficult to expect an improved effect due to the additional addition due to the saturation of the foam pore formation compared to Inventive Examples 6 to 10, and the excessive foaming caused the coating film to become soft or was economically unfavorable.

As described above, exemplary embodiments of the present disclosure have been described in the detailed description of the present disclosure, but those of ordinary skill in the art to which the present disclosure pertains may be variously modified without departing from the scope of the present disclosure. Therefore, the scope of the present disclosure is not construed as being limited to the embodiments described above, but should be defined by the following claims as well as equivalents thereto.

The invention claimed is:

1. An unconstrained vibration damping metal sheet with foam pores, comprising:
   a metal sheet;
   an organic-inorganic pretreatment layer containing a blend of an acrylic resin combined with inorganic substance formed on the metal sheet; and a
   foam resin layer formed on the pretreatment layer, wherein the foam resin layer contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%, and wherein a thickness of the foam resin layer ranges from 5 to 80 μm.

2. The unconstrained vibration damping metal sheet with foam pores of claim 1, wherein the foaming agent is a powder foaming agent or a foamed capsule.

3. The unconstrained vibration damping metal sheet with foam pores of claim 2, wherein the powder foaming agent is an azodicarbonamide-based powder foaming agent.

4. The unconstrained vibration damping metal sheet with foam pores of claim 2, wherein the foamed capsule has a diameter of 1 to 20 μm in which a foaming agent is contained in a thermoplastic cell structure.

5. The unconstrained vibration damping metal sheet with foam pores of claim 1, wherein the foam resin layer has a foam pore having an average diameter of 5 to 100 μm.

6. The unconstrained vibration damping metal sheet with foam pores of claim 1, wherein a thickness of the pretreatment layer ranges from 0.1 to 2 μm.

7. The unconstrained vibration damping metal sheet with foam pores of claim 1, wherein the metal sheet is one selected from a cold-rolled steel sheet, a hot-rolled steel sheet, a galvanized steel sheet, a zinc alloy-plated steel sheet, a stainless steel sheet, and an aluminum plate.

8. The unconstrained vibration damping metal sheet with foam pores of claim 1, wherein the oxide-based crosslinker is dicumyl peroxide.

9. The unconstrained vibration damping metal sheet with foam pores of claim 1, wherein an average diameter of the spherical silica has a size ranging from 1 to 30 μm.

10. The unconstrained vibration damping metal sheet with foam pores of claim 1, wherein the plasticizer is one selected from the group consisting of bis(2-ethylhexyl) adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), and trimethyl pentanyl diisobutylate.

11. A method for manufacturing an unconstrained vibration damping metal sheet with foam pores, the method comprising:
   preparing a base metal sheet;
   forming a pretreatment layer with a thickness of 0.1 to 2 μm by applying an organic-inorganic pretreatment solution containing a blend of an acrylic resin combined with inorganic substance on the base metal sheet and then curing the organic-inorganic pretreatment solution at 60 to 150° C.; and
   forming a foam resin layer by applying a foam resin solution, which contains, based on weight % thereof, a thermoplastic polyvinyl chloride resin: 40 to 80%, a plasticizer: 5 to 40%, a foaming agent: 0.1 to 10%, an oxide-based crosslinker: 1 to 4%, and spherical silica: 1 to 10%, on the formed pretreatment layer to a thickness of 5 to 80 μm and foaming the foam resin solution in a temperature range of 200 to 220° C.

* * * * *